United States Patent [19]

Yoshizaki

[11] 4,136,264

[45] Jan. 23, 1979

[54] PRIVATE AUTOMATIC BRANCH EXCHANGE HAVING TWO EXCHANGE UNITS

[75] Inventor: Mineo Yoshizaki, Yokosuka, Japan

[73] Assignee: Hitachi, Ltd., Japan

[21] Appl. No.: 788,537

[22] Filed: Apr. 18, 1977

[30] Foreign Application Priority Data

Apr. 19, 1976 [JP] Japan .................. 51-43731

[51] Int. Cl.² ............................ H04M 7/00
[52] U.S. Cl. ..................... 179/18 AD; 179/18 AH
[58] Field of Search ........ 179/18 AH, 18 AD, 27 CA

[56] References Cited

U.S. PATENT DOCUMENTS 3,264,415  8/1966  Burns et al. .............. 179/18 AH

Primary Examiner—William C. Cooper

Attorney, Agent, or Firm—Craig & Antonelli

[57] ABSTRACT

A private automatic branch exchange (PABX) system having first and second exchange units each including a marker and a switch frame wherein the connection between a central office called trunk belonging to the first exchange unit and a subscriber belonging to the first exchange unit is made through the switch frame of the first exchange unit by activating only the marker of the first exchange unit from a position circuit, and the connection between the central office called trunk and a subscriber belonging to the second exchange unit is made through the switch frame of the first exchange unit, an interunit trunk and the switch frame of the second exchange unit by sequentially activating the marker of the first exchange unit and the marker of the second exchange unit from the position circuit.

11 Claims, 2 Drawing Figures

PRIVATE AUTOMATIC BRANCH EXCHANGE HAVING TWO EXCHANGE UNITS

The present invention relates to a private automatic branch exchange (PABX) system, and particularly to a PABX system having two exchange units.

In the past, when two exchange units of a small capacity have been combined to form a large capacity exchange system and a call to a central office incoming trunk belonging to one of the exchange units is to be connected to a called subscriber belonging to the other exchange unit through an interunit trunk, the central office called trunk and the interunit trunk are interconnected by the one exchange unit and thereafter the number of the called subscriber is sent to the other exchange unit from the one exchange unit through the interunit trunk while the connection between the interunit trunk and the called subscriber is made by the other exchange unit. However, the prior art system has the drawback of high cost in that a sender for sending the number of the called subscriber in the one exchange unit and a register for receiving the number of the called subscriber in the other exchange unit are required.

It is, therefore, a primary object of the present invention to provide an economic, large capacity PABX system having two small capacity exchange units.

It is another object of the present invention to provide a large capacity PABX system by adding a small amount of hardware to two exchange units while adding substantially no modification to the control units or the like of the exchange units.

In accordance with a feature of the present invention, in a PABX system wherein a central office trunk belonging to a first exchange unit is connected to a second exchange unit through a switch frame of the first exchange unit, an interunit trunk and a switch frame of the second exchange unit, when a central office trunk being called from the central office is to be connected to a called subscriber, additional hardware is provided, which comprises a means for determining whether the called subscriber's number belongs to the first exchange unit or the second exchange unit, a means responsive to the result of that determination to send either the called subscriber's number or an interunit trunk number to the marker of the first exchange unit for connecting the central office trunk with the called subscriber or the interunit trunk through the switch frame of the first exchange unit, and means operative when the connection between the central office called trunk and the interunit trunk has been made to activate the marker of the second exchange unit to send the called subscriber's number for connecting the interunit trunk with the called subscriber belonging to the second exchange unit through the switch frame of the second exchange unit.

In accordance with a preferred embodiment of the present invention, a feature of the present invention resides in that the additional hardware is provided as an adapter of a position circuit belonging to an attendant console, and the position adapter is connected with the first and second exchange units through respective connectors and with the interunit trunk through an interunit link.

These and other objects, features and advantages of the present invention will be apparent from the following description of the preferred embodiment of the invention when taken in conjunction with the accompanying drawings, in which.

Figure 1:
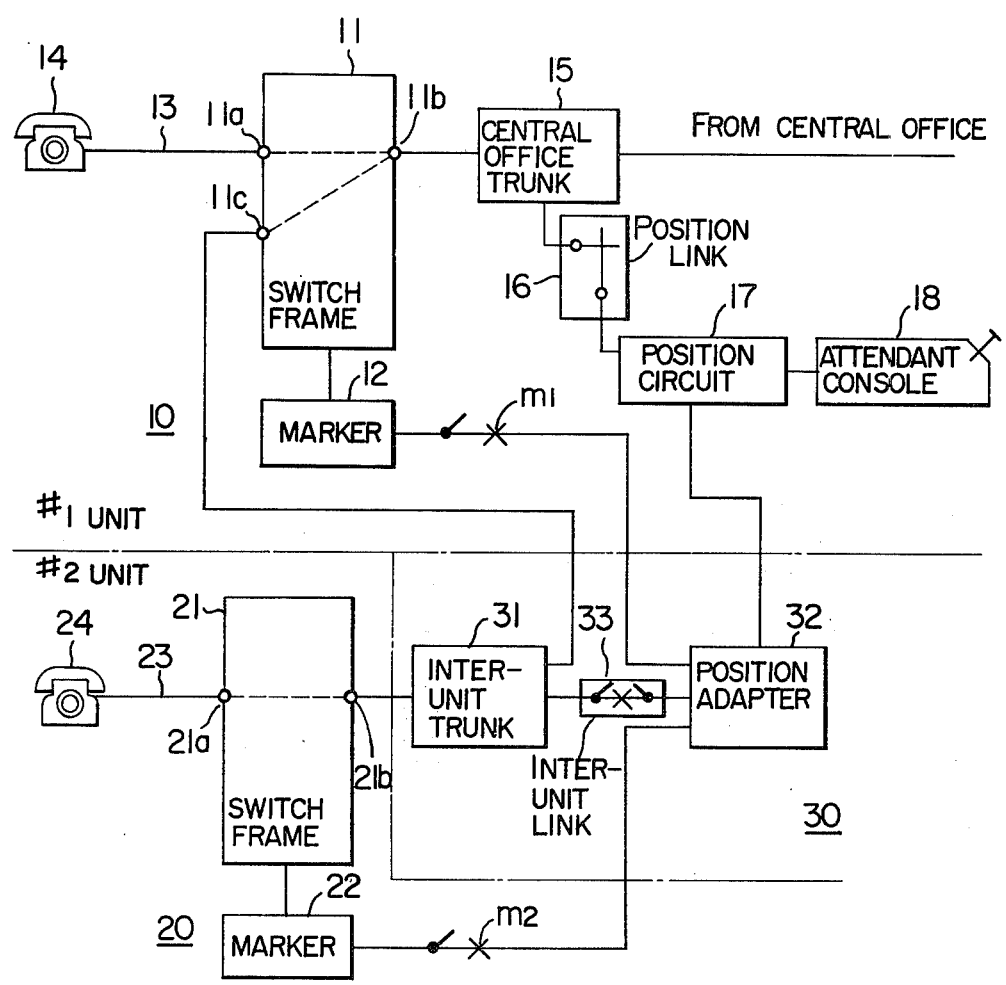
FIG. 1 is a block diagram illustrating one embodiment of a PABX system in accordance with the present invention.

Referring to FIG. 1, there is shown a PABX system in which a first exchange unit 10 and a second exchange unit 20 are coupled by an additional unit 30 of the present invention. The first exchange unit 10 and the second exchange unit 20 include switch frames 11 and 21, respectively, and markers 12 and 22, respectively, for controlling the switch frames. Connected to line terminals 11a and 21a of the switch frames 11 and 21, respectively, through extension lines 13 and 23, respectively, are extension telephone sets 14 and 24.

Connected to trunk terminal 11b of the switch frame 11 of the first exchange unit 10 is a central office trunk 15, which is adapted to be selectively connected to a position circuit 17 through a position link 16. The position circuit 17 belongs to an attendant console 18. The construction so far described comprising the first and second exchange units 10 and 20 is similar to that of a prior art system, and for this reason, will not be described in further detail.

A line terminal 11c of the switch frame 11 of the first exchange unit 10 is connected to a trunk terminal 21b of the switch frame 21 of the second exchange unit 20 through an interunit trunk 31. The additional unit 30 includes a position adapter 32 connected to the position circuit 17 of the first exchange unit 10, which position adapter 32 is adapted to be connected to the markers 12 and 22 of the first and second exchange units 10 and 20 through connectors m1 and m2, respectively, and also to the interunit trunk 31 through the interunit link 33.

Figure 2:
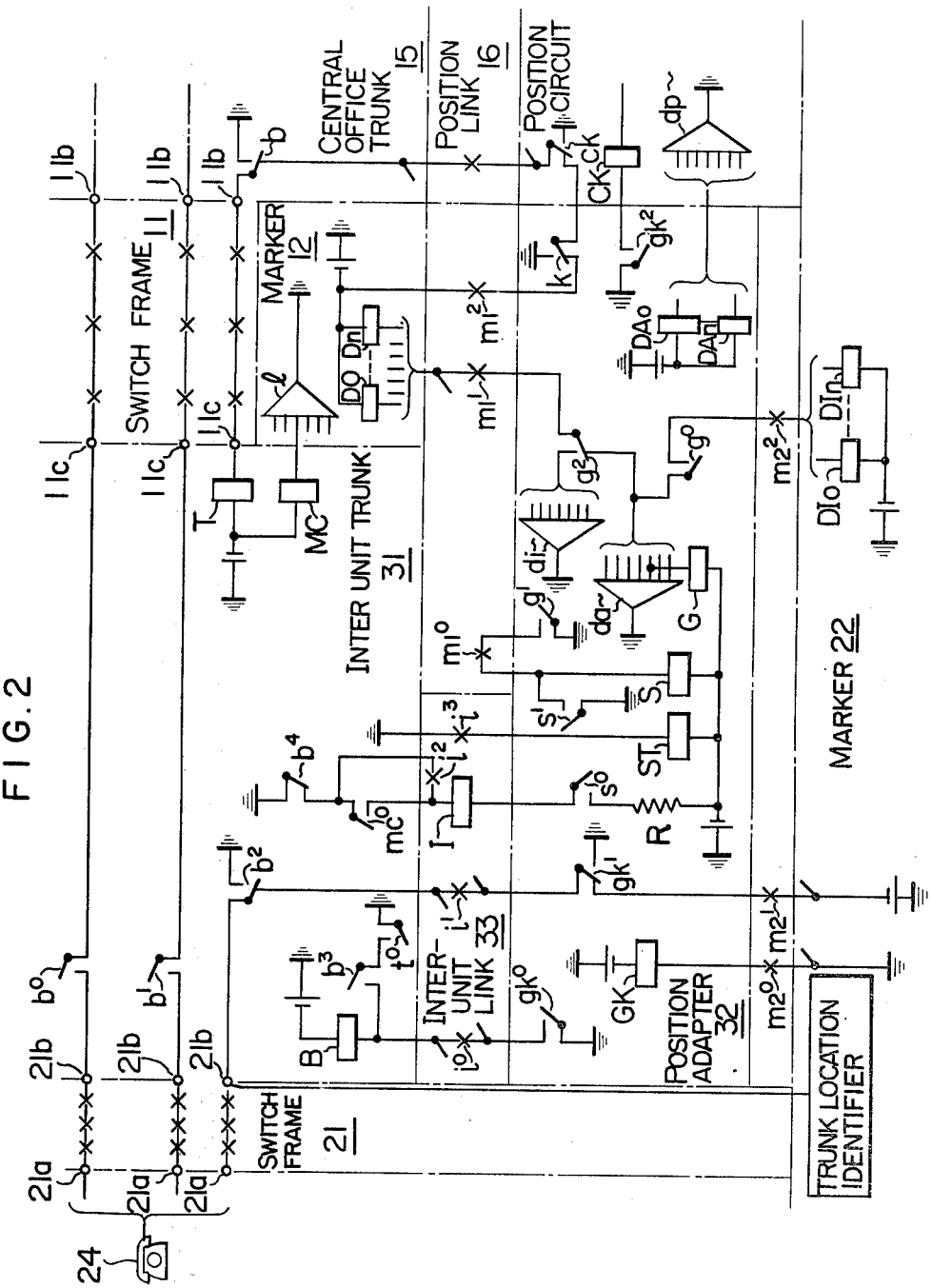
FIG. 2 is a circuit diagram showing a major portion of the system of FIG. 1.

FIG. 2 shows a circuit diagram of those portions of FIG. 1 which relate to the feature of the present invention, that is, the circuit of the interunit trunk 31, the position adapter 32 and the interunit link 33 and the circuit relating to the markers 12 and 22, the central office trunk 15, the position link 16 and the position circuit 17.

Referring now to FIGS. 1 and 2, the operation of connecting the central office trunk 15, to which a call from a central office has been received, with the extension telephone set 24 of the second exchange unit 20 is described.

When the call from the central office is received by the central office trunk 15, the call received is indicated at the attendant console 18 by a well known means. When an attendant at the attendant console 18 responds to the call, the attendant console 18 is connected to the central office trunk 15 by means of the position link 16 through the position circuit 17. The attendant is informed by the calling subscriber of the identity of the called extension subscriber and sends that subscriber's telephone number to the position circuit 17, which in turn stores that subscriber's telephone number as the called extension number and sends it to number receiving relays $DA_o$ to $DA_n$ of the position adapter 32 in FIG. 2 from an extension number sending circuit dp~. The position adapter 32 activates the marker 12 by a circuit not shown by closing connector contacts $m1^0$ to $m1^2$. Ground levels appear at the outputs of a contact tree circuit da~ of the number receiving relays $DA_o$ to $DA_n$ in accordance with the number received.

When the number received corresponds to that of the subscriber 14 (FIG. 1) of the first exchange unit 10, a unit discrimination relay G is not operated so that the ground outputs of the contact tree circuit da~ are applied to the number receiving relays $D_o$ to $D_n$ of the marker 12 through a break contact of a contact $g^2$ and a connector contact m1'. Accordingly, the relays $D_o$ to $D_n$ are operated in accordance with the number. The marker 12 determines a terminal position of the extension telephone set 14 on the switch frame 11 from the received number and connects the extension line 13 with the central office trunk 15.

On the other hand, when the number received corresponds to that of the extension telephone set 24 belonging to the second exchange unit 20, the relay G in the position adapter 32 is operated by the output of the contact tree circuit da~ and a relay S is operated and held through contact g, when the connector m1 is closed. As the relay G is operated, an output of an interunit trunk representative number sending circuit di~ of the position adapter 32 is applied to the number receiving relays $D_o$ to $D_n$ of the marker 12 through a make contact of the contact $g^2$. The marker 12 determines from the received number the need for the connection with the interunit trunk and selects one of idle interunit trunks, e.g. the interunit trunk 31 and connects the selected interunit trunk 31 with the central office trunk 15 through the switch frame 11 and operates a relay MC of the interunit trunk 31 through a selected relay contact tree circuit l. When the connection of the central office trunk 15 and the interunit trunk 31 has been completed, the marker 12 operates a relay K, not shown, of the position adapter by a circuit not shown to hold the connection of the switch frame 11 by an applied ground level through a contact k of the relay K and also operates a relay T of the interunit trunk 31. On the other hand, when the relay MC is, a link relay I is energized through a path including ground-break contact $b^4$ — make contact $mc^o$ — relay I — --- make contact $s^o$ — resistor R — battery so that contact $i^0$ to $i^3$ of the link relay I are closed. When the above operation has been completed, the marker 12 releases the connector m1 and resets the relay M. The relay I is held by the contact $i^2$. A second marker start relay ST of the position adapter 32 is energized by the ground level from the contact $i^3$. As the relay ST is operated, the marker 22 of the second exchange unit is activated by a known circuit, not shown, so that connector contacts $m2^0$ to $m2^2$ are closed. As a result, the number receiving relays $DI_o$ to $DI_n$ of the marker 22 are operated through a path including ground-contact tree circuit $da\frac{1}{2}$— make contact $g^o$ — connector contact $m2^2$ — number receiving relays $DI_o$ to $DI_n$ — battery. Then, the marker 22 identifies the position of the interunit trunk 31 on the switch frame 21 by a path including battery — connector contact $m2^1$ — break contact $gk^1$ — contact $i^1$ — break contact $b^2$ — terminal 21b — trunk position identification circuit. Since the terminal positions of the interunit trunk 31 and the extension telephone set 24 have been determined, the marker 22 causes them to be connected through the switch frame. When this has been completed, the marker 22 operates the relay GK of the position adapter 32 through a path of earth — --- connector contact $m2^o$ — relay GK — battery. A relay B of the interunit trunk 31 is operated by earth level from the contact $gk^o$ and the relay B holds itself by earth level from a make contact $b^3$ and a make contact $t^o$. The interunit trunk 31 holds the connection path in the switch frame 21 by the earth level from the make contact $b^2$ and holds the direct path of the speech line by the contacts $b^0$ and $b^1$.

On the other hand, since the relay CK of the position circuit 17 is operated by the earth level from the contact $gk^2$, the position circuit 17 ground a relay B, not shown, in the central office trunk 15 by a circuit not shown and holds the connection path in the switch frame 11 and the relay T by a contact b of the relay B. Thereafter, the position adapter 32 restores the connector m2 so that the marker 22 is restored.

Thus, the central office trunk 15 has been completely connected to the extension telephone set 24 through the switch frame 11, the interunit trunk 31 and the switch frame 21. Thereafter, as in a known private exchange, the central office trunk 15 sends the call to the extension telephone set 24 and when the called subscriber responds thereto the speech therebetween is accomplished. When the speech has been terminated and the extension telephone set 24 is on hook, the central office trunk 15 is restored and the contact b is opened so that the connection path of the switch frame 11 is restored and the relay T of the interunit trunk 31 is also restored. As the relay T is restored, the relay B of the interunit trunk 31 is restored and the connection path of the switch frame 21 is opened by the contact $b^2$ of the relay B.

What is claimed is:

1. A PABX system comprising:
a first exchange unit including a first switch frame having a plurality of terminal positions, a first marker for controlling said first switch frame to establish a connection path between any two of said terminal positions, and a central office trunk connected to one of said terminal positions;
a second exchange unit including a second switch frame having a plurality of terminal positions, a second marker for controlling said second switch frame to establish a connection path between any two of said terminal positions, and an extension telephone set connected to one of said terminal positions;
an interunit trunk connecting another one of said terminal positions of said first switch frame with another one of said terminal position of said second switch frame; and
control means selectively connected to said first and second markers for connecting said central office trunk which has received a call from a central office to said extension telephone set of said second exchange unit, including first means for sending information identifying said interunit trunk to said first marker to establish a first connection path between said central office trunk and said interunit trunk and second means for sending along a path separate from said first connection path information identifying the extension telephone set number to said second marker to establish a second connection path between said interunit trunk and said extension telephone set.

2. A PABX system according to claim 1 wherein said plurality of terminal positions of said first and second switch frames include line terminal positions and trunk terminal positions.

3. A PABX system according to claim 2 wherein said central office trunk is connected to one of the trunk terminal positions of said first switch frame.

4. A PABX system according to claim 2 wherein said interunit trunk is connected to one of the line terminal positions of said first switch frame and to one of the trunk terminals of said second switch frame.

5. A PABX system comprising:

a first exchange unit including a first switch frame having a plurality of terminal positions, a first marker for controlling said first switch frame to establish a connection path between any two of said terminal positions, a central office trunk connected to one of said terminal positions, a first extension telephone set connected to another one of said terminal positions, and a position circuit associated with an attendant console;

a second exchange unit including a second switch frame having a plurality of terminal positions, a second marker for controlling said second switch frame to establish a connection path between any two of said terminal positions, and a second extension telephone set connected to one of said terminal positions;

an interunit trunk connecting a further one of said terminal positions of said first switch frame with another one of said terminal positions of said second switch frame;

an adapter of said position circuit including first means for determining whether a called subscriber number belongs to said first exchange unit or said second exchange unit, second means responsive to said first means for driving said first marker when said called subscriber corresponds to said second extension telephone set belonging to said second exchange unit to establish a first connection path through said first switch frame between said central office trunk and said interunit trunk, and third means for driving said second marker after establishment of said first connection path in accordance with number information of said extension telephone set forwarded from said first means directly to said second marker in order to establish a second connection path between said interunit trunk and said extension telephone set through said second exchange unit.

6. A PABX system according to claim 5 wherein said plurality of terminal positions of said first and second switch frames include line terminal positions and trunk terminal positions.

7. A PABX system according to claim 6 wherein said central office trunk is connected to one of the trunk terminal positions of said first switch frame.

8. A PABX system according to claim 6 wherein said interunit trunk is connected to one of the line terminal positions of said first switch frame and one of the trunk terminals of said second switch frame.

9. A PABX system according to claim 5 wherein said adapter is connected to said first marker and said second marker through a connector and also connected to said interunit trunk through a link.

10. A PABX system according to claim 5 wherein said adapter further includes means for driving said first marker when said called subscriber corresponds to an extension telephone set belonging to said first exchange unit and sending out number information of said extension telephone set belonging to said first exchange unit to said first marker in order to make a connection path between said central office trunk and said extension telephone set belonging to said first exchange unit.

11. A PABX system comprising first and second exchange units each having a marker and switch frames, respectively, wherein the connection between a central office trunk belonging to said first exchange unit and an extension telephone set belonging to said first exchange unit is made by operating only a marker of said first exchange unit by an adapter of a position circuit cooperating with an attendant console belonging to said first exchange unit, and the connection between said cental office trunk and an extension telephone set belonging to said second exchange unit is made through the switch frame of said first exchange unit, an interunit trunk, and the switch frame of said second exchange unit by successively operating the marker of said first exchange unit and the marker of said second exchange unit directly from the output of said adapter.

* * * * *